April 5, 1927. 1,623,043
E. BROWN
VALVE OPERATING MECHANISM
Filed Oct. 16, 1925
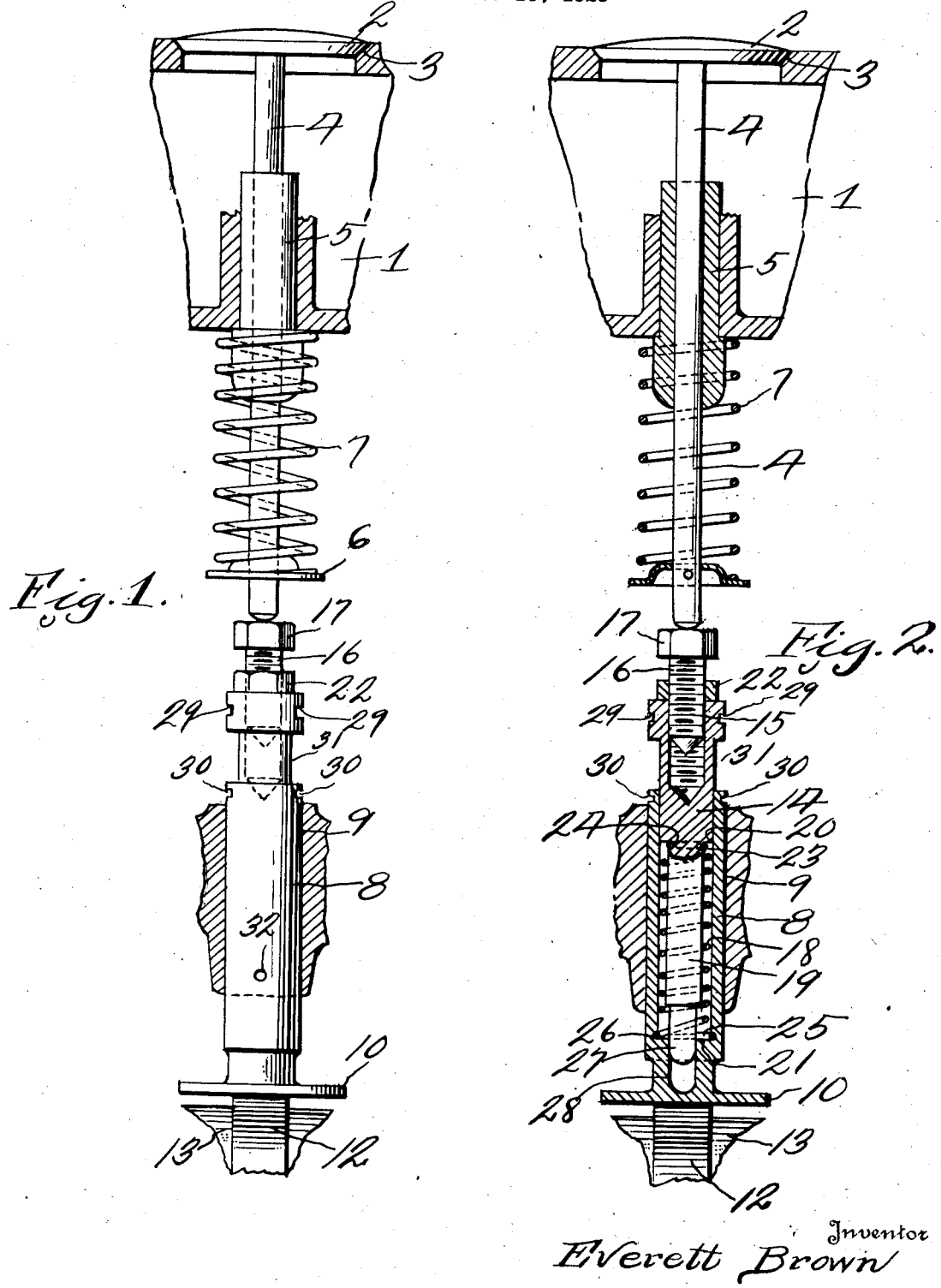
Inventor
Everett Brown
By D. Swift
Attorney Patented Apr. 5, 1927.

1,623,043

UNITED STATES PATENT OFFICE.

EVERETT BROWN, OF HARDY, KENTUCKY.

VALVE-OPERATING MECHANISM.

Application filed October 16, 1925. Serial No. 62,792.

The invention relates to valve operating mechanisms and has for its object to a yieldable vertically slidable sleeve below a valve stem and engaging a cam, which sleeve has slidably mounted therein a valve stem engaging member which is normally forced towards the valve-stem by means of a coiled spring within the sleeve, which spring is weaker than the valve stem spring, so it will not lift the valve, but will be sufficiently strong to maintain the sleeve in engagement with the cam and the other member of the assembly in engagement with the valve stem.

A further object is to provide an adjustable member which engages the valve stem, and by means of which the tension of the spring within the sleeve may be varied.

A further object is to provide a groove in the lower end of the sleeve for the reception of the lower convolution of the spring and a groove carried by the member slidably mounted within the sleeve for the reception of the upper convolution of the spring, and which convolutions maintain the parts assembled at all times particularly when handling the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a view in elevation of the valve operating mechanism.

Figure 2 is a vertical transverse sectional view through the valve operating mechanism.

Referring to the drawing, the numeral 1 designates a portion of a conventional form of internal combustion engine, 2 a valve which cooperates with a valve seat 3 and 4 the valve stem. The valve stem 4 is slidably mounted in a bearing sleeve 5 carried by the engine 1, and surrounding the valve stem and interposed between the engine 1 and a washer 6 is a spring 7. The spring 7 normally forces the washer and valve stem 4 downwardly and maintains the valve 2 seated. It is to be understood that the valve 2 may be an exhaust or an intake valve as desired and the push rod structure hereinafter set forth may be used in connection with any kind of a valve stem of an engine. The push rod comprises a sleeve 8, which is slidably mounted in a bearing 9 of the engine, and which sleeve at its lower end terminates in a disc 10 which engages the cam 12 of a cam shaft 13 which is of a conventional construction. Heretofore push rods have been of uniform nonadjustable lengths and as wear takes place a clicking noise develops, which is extremely objectionable and can not be easily taken up. It has also been found where an adjusting member carried by the push rod is used, the wear is not automatically taken up but has to be manually set at various times, and to obviate this difficulty a rod 14 is slidably mounted in the sleeve 8. Threaded at 15 into the upper end of the rod 14 is a bolt 16, the head 17 of which engages the lower end of the valve stem 4 and is maintained in engagement therewith by means of the coiled spring 18, which surrounds the reduced portion 19 of the rod and is interposed between the shoulder 20 of the rod and the shoulder 21 in the bottom of the sleeve 8. The expansive power of the spring 18 is less than the expansive power of the valve spring 7, therefore it will be seen that the spring 18 will not overcome the spring 7 and unseat the valve 2. Threaded on the bolt 16 is a lock nut 22, and by means of which lock nut the bolt 16 may be positively locked in adjusted position after an adjustment thereof; at the same time it will be seen that any slack which may develop incident to wear or play will be immediately taken up by the coiled spring 18, and at the same time the disc member 10 will be maintained in engagement with the cam 12 at all times and the head 17 of the bolt 16 in engagement with the lower end of the valve stem 4 without interfering in any way with the seating and unseating of the valve 2, and at the same time the shock of the sudden unseating of the valve is taken up and objectionable noises eliminated. The upper convolution of the coiled spring 18 is disposed in an annular groove 24 of the reduced portion 19 of the rod 14 and the lower convolution 25 of said spring is disposed in a groove 26 of the sleeve 8, therefore it will be seen that said convolutions will maintain the slidable rod 14 connected to the sleeve 8 at all times, thereby preventing the parts from becoming separated and allowing the device to be sold as a unit so that it can be applied to engines as at present constructed. The lower end of the reduced portion 19 of the rod 14 is provided with a further reduced portion 27, which is slidably mounted in a bearing 28 in the bottom of the sleeve 8, thereby insuring an accurate axial guiding of the rod 14 in relation to the sleeve 8 at all times without danger of sticking or jamming.

From the above it will be seen that an internal combustion engine push valve rod or assembly is provided which is simple in construction, will eliminate noise incident to the unseating of the valve and will automatically take up play as it develops. It will also be seen that the coiled spring 18 is entirely housed thereby preventing the same from becoming clogged incident to the collection of foreign matter.

The enlarged upper end of the rod 14 has its opposite sides provided with recesses 29 preferably in the form of slots for the reception of an end wrench, and the sleeve 8 has its opposite sides provided with slots 30 for the reception of an end wrench, whereby the sleeve 8 and the rod 14 may be positively held against rotation during the adjustment of the device and in adjusted position during the adjustment of the bolt 16 and the nut 22. The gap 31 between the enlarged end of the rod 14 and the sleeve 8 will vary according to the design of engine valve structure. The sleeve 8 is provided with an oil hole 32 so that as oil is sucked into the top it may pass out adjacent the lower end of the sleeve 8.

The invention having been set forth what is claimed as new and useful is:—

The combination with a valve stem of an internal combustion engine, a cam disposed beneath said stem, of a push rod interposed between the cam and the stem, said push rod comprising a slidably mounted sleeve, a rod slidably mounted within the sleeve, a reduced portion carried by the rod thereby forming a shoulder within the sleeve, a coiled spring surrounding the reduced portion of the sleeve, said coiled spring being interposed between the shoulder and the sleeve, the end convolutions of the coiled spring being disposed in annular channels of the push rod and sleeve, one end convolution contractably engaging in the annular groove of the push rod, the other end convolution expansively engaging in the annular groove of the sleeve, a bolt adjustably threaded into the upper end of the rod and engaging the valve stem and a lock nut carried by said bolt.

In testimony whereof I have signed my name to this specification.

EVERETT BROWN.